(12) United States Patent
Teich et al.

(10) Patent No.: US 7,183,549 B2
(45) Date of Patent: Feb. 27, 2007

(54) MULTIPLE CAMERA SYSTEMS AND METHODS

(75) Inventors: Andrew C. Teich, West Linn, OR (US); Jeff Frank, Santa Barbara, CA (US)

(73) Assignee: Flir Systems, Inc., Portland, OR (US)

( * ) Notice: Subject to any disclaimer, the term of this patent is extended or adjusted under 35 U.S.C. 154(b) by 231 days.

(21) Appl. No.: 10/936,896

(22) Filed: Sep. 9, 2004

(65) Prior Publication Data

US 2006/0049350 A1    Mar. 9, 2006

(51) Int. Cl.
*H01L 31/00* (2006.01)
(52) U.S. Cl. .................................... 250/330
(58) Field of Classification Search ................ 250/330
See application file for complete search history.

(56) References Cited

U.S. PATENT DOCUMENTS

| | | | |
|---|---|---|---|
| 5,627,374 A * | 5/1997 | Couderc et al. ............ 250/334 |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,738,073 B2 | 5/2004 | Park et al. |
| 2005/0029458 A1* | 2/2005 | Geng et al. ............... 250/347 |

\* cited by examiner

*Primary Examiner*—Constantine Hannaher
*Assistant Examiner*—Chris Webb
(74) *Attorney, Agent, or Firm*—MacPherson Kwok Chen & Heid LLP; Greg J. Michelson

(57) ABSTRACT

Systems and methods are disclosed herein to provide improved cameras and camera systems. For example, in accordance with an embodiment of the present invention, a networkable camera system is disclosed that is able to provide up to a 360° field of view and is operable during day and night conditions by utilizing thermal imagers.

18 Claims, 7 Drawing Sheets

US 7,183,549 B2

MULTIPLE CAMERA SYSTEMS AND METHODS

TECHNICAL FIELD

The present invention relates generally to cameras and, more particularly, to multiple camera systems.

BACKGROUND

Cameras and various types of camera systems are well known and applied in a wide variety of applications to view and/or record images. A typical application, for example, of a camera system is to provide surveillance, such as for perimeter and facility security or general area awareness or monitoring of a given area. However, conventional cameras and camera systems have a number of potential drawbacks.

For example, a conventional camera or camera system for surveillance has a limited or narrow field of view. To overcome this limitation, for example, the camera may be mechanically-driven to point at a desired area to be monitored that exceeds its limited field of view. However, this allows a portion of the required field of view to be unmonitored for a certain period of time, depending upon the slewing parameters of the mechanically-driven camera. As a result, there is a need for an improved camera and camera techniques.

SUMMARY

Systems and methods are disclosed herein to provide improved cameras and camera systems. For example, in accordance with an embodiment of the present invention, a camera system is disclosed having a wide field of view and operable during day and night conditions. The camera system, for example, may be expandable to multiple cameras, with one or more of the cameras utilizing a thermal imager. The cameras may be incorporated into the camera system to provide up to a 360° field of view, with the information provided via a wired or a wireless connection. A full panoramic view may be provided with electronic panning and point and click zoom to allow an almost instantaneous movement between widely spaced points of interest. Furthermore, a camera may be incorporated into the camera system having longer-range, narrow field of view optics to zoom in on specific areas of interest.

More specifically, in accordance with one embodiment of the present invention, a camera system includes a first infrared camera having a first field of view and adapted to provide thermal image data; a second infrared camera having a second field of view and adapted to provide thermal image data, wherein the first and second field of view provide a wide field of view; and an interface circuit adapted to receive and transfer the thermal image data from the first and second infrared camera.

In accordance with another embodiment of the present invention, a method of viewing an area of interest includes providing a first thermal image data covering a first wide field of view; providing a second thermal image data covering a second wide field of view, wherein the second wide field of view overlaps a portion of the first wide field of view; and displaying the first thermal image data and the second thermal image data.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
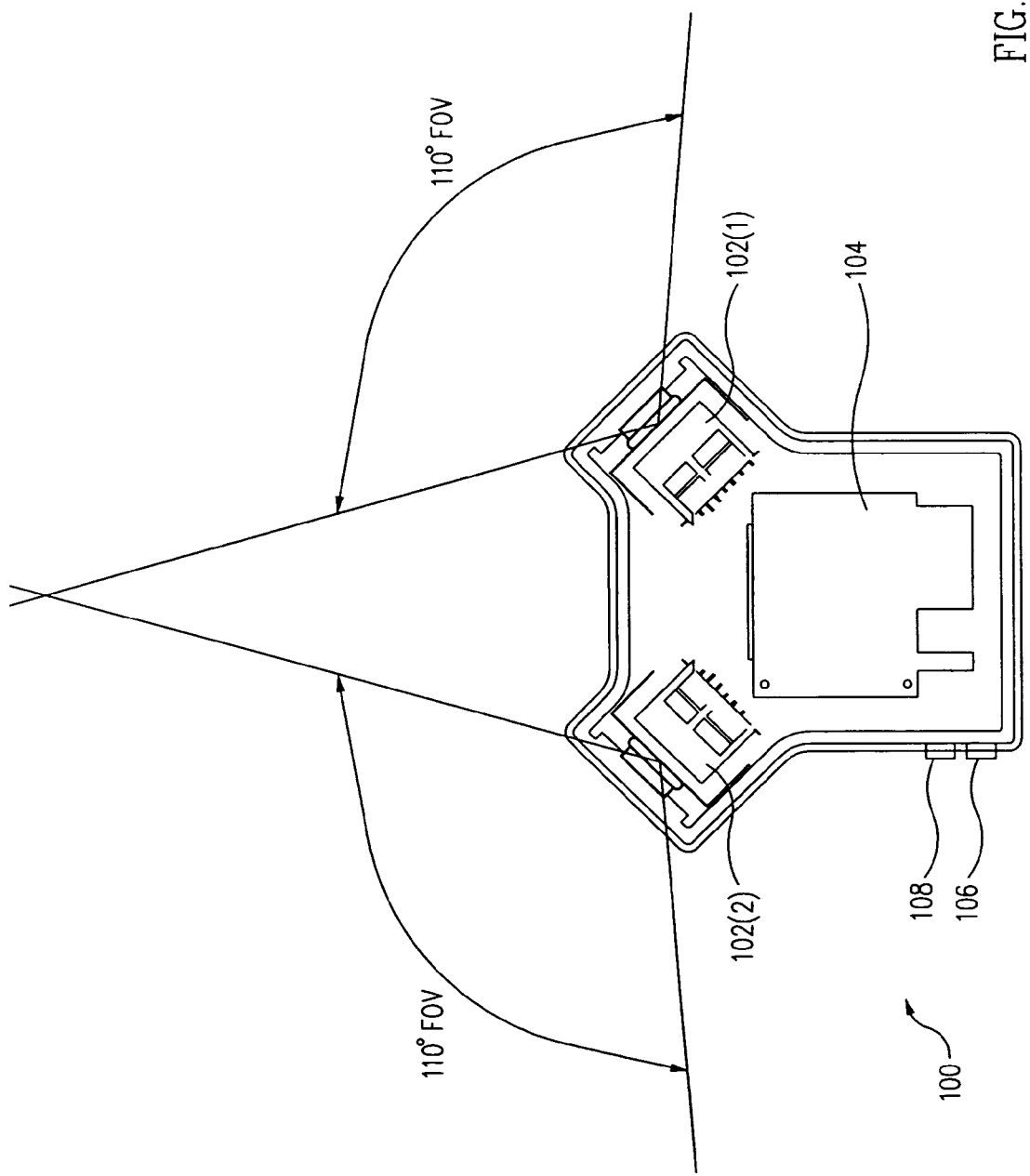
FIG. 1 shows a block diagram illustrating a camera system in accordance with an embodiment of the present invention.

FIG. 1 shows a block diagram illustrating a camera system 100 in accordance with an embodiment of the present invention. Camera system 100 includes one or more of cameras 102, which for this exemplary implementation contains two of cameras 102 (separately referenced as camera 102(1) and camera 102(2)).

Camera 102 may have a wide field of view (FOV). For example, as shown in FIG. 1, each camera 102 may have a 110° FOV to cover a wide area of interest. By combining camera 102(1) and camera 102(2) within camera system 100 (or additional ones of cameras 102 as discussed further below), a field of view greater than 180° (e.g., 220° FOV) may be provided.

Camera 102, in accordance with an embodiment of the present invention, may represent an infrared camera (or include a thermal imager). As a specific example, camera 102 may be an infrared camera that includes a focal plane array having an uncooled vanadium oxide (VOX)-based microbolometer, with a 320 by 124 format, 38 µm pixel size, 7.5 to 13.5 µm spectral response, a 60 Hz frame rate, logarithmic automatic gain control, and an f/1.2 aperture. Thus, cameras 102(1) and 102(2) within camera system 100 may provide approximately a 180° horizontal FOV by a 43° vertical FOV (640 by 124 format), with an estimated detection range (on-axis) of 150 m for a person and 200 m for an automobile.

With a 320 by 124 format for the focal plane array, high resolution across a wide horizontal FOV is provided, which for many applications would be desirable. The applications may include, for example, day or night fence-line or perimeter surveillance and security, general area awareness or monitoring, border patrol, and facilities security or monitoring. However, if high resolution with a large vertical FOV is required, camera system 100 may be rotated 90° or camera 102 may be implemented with, for example, a 124 by 320 format for its focal plane array or a format suitable for the desired application.

Camera system 100 may also include circuitry 104, a data interface 106, and a power supply terminal 108. Circuitry 104 may include circuits and various electronics required by cameras 102 or cameras 102 may be self contained, with circuitry 104 functioning to transfer and/or store control and data information between cameras 102 and an external device (not shown).

As an example, cameras 102 may represent infrared cameras, with each providing 14-bit uncompressed digital image data to circuitry 104 or analog image data (e.g., NTSC RS-170A standard). Circuitry 104 includes the electronics to receive and transfer the data from cameras 102 via data interface 106. For example, circuitry 104 may represent Ethernet driver stacks and an Ethernet switch to transfer the data via data interface 106 (e.g., an Ethernet terminal coupled to a 10, 100, and/or 1000 Mbps Ethernet line or network or optical Ethernet interface) to the external device (e.g., a computer, a recorder, or a display) to view and/or record the images provided by camera system 100.

As another example or additionally, circuitry 104 may represent or further include wireless interface circuitry to transfer the data via data interface 106 (e.g., an antenna to facilitate the transmission of the data to the external device). Data interface 106 may further include a transmitter for transmitting the data, if configured with an antenna, or the transmitter may be incorporated into circuitry 104. Thus, data interface 106 may represent an antenna for wirelessly transferring data, control, and other information or data interface 106 may represent a terminal connection for directly connecting a line (e.g., a network line, cable, or other wired interface) to camera system 100 for transferring data, control, and other information between camera system 100 and the external device.

Circuitry 104 may also function to convert the power received via power supply terminal 108 and supply the desired power levels to cameras 102 and circuits within circuitry 104. For example, power supply terminal 108 may be able to receive 24–36 VAC (e.g., 60 Hz), 10–36 VDC, and/or 120 VAC (e.g., 60 Hz) power supply voltages, with circuitry 104 converting the power supply voltages to the desired levels. Alternatively or in addition, camera system 100 may include a battery to supply power to camera system 100 (e.g., as a backup when power via power supply terminal 108 is not available).

Circuitry 104 may also include an image processor, such as a digital image processor or an image compressor/processor. Alternatively, the image processor may be included in the external device. As described further herein, the image processor may provide motion detection, dynamic range adjustments, and other camera control and/or image manipulation functions.

Figure 2:
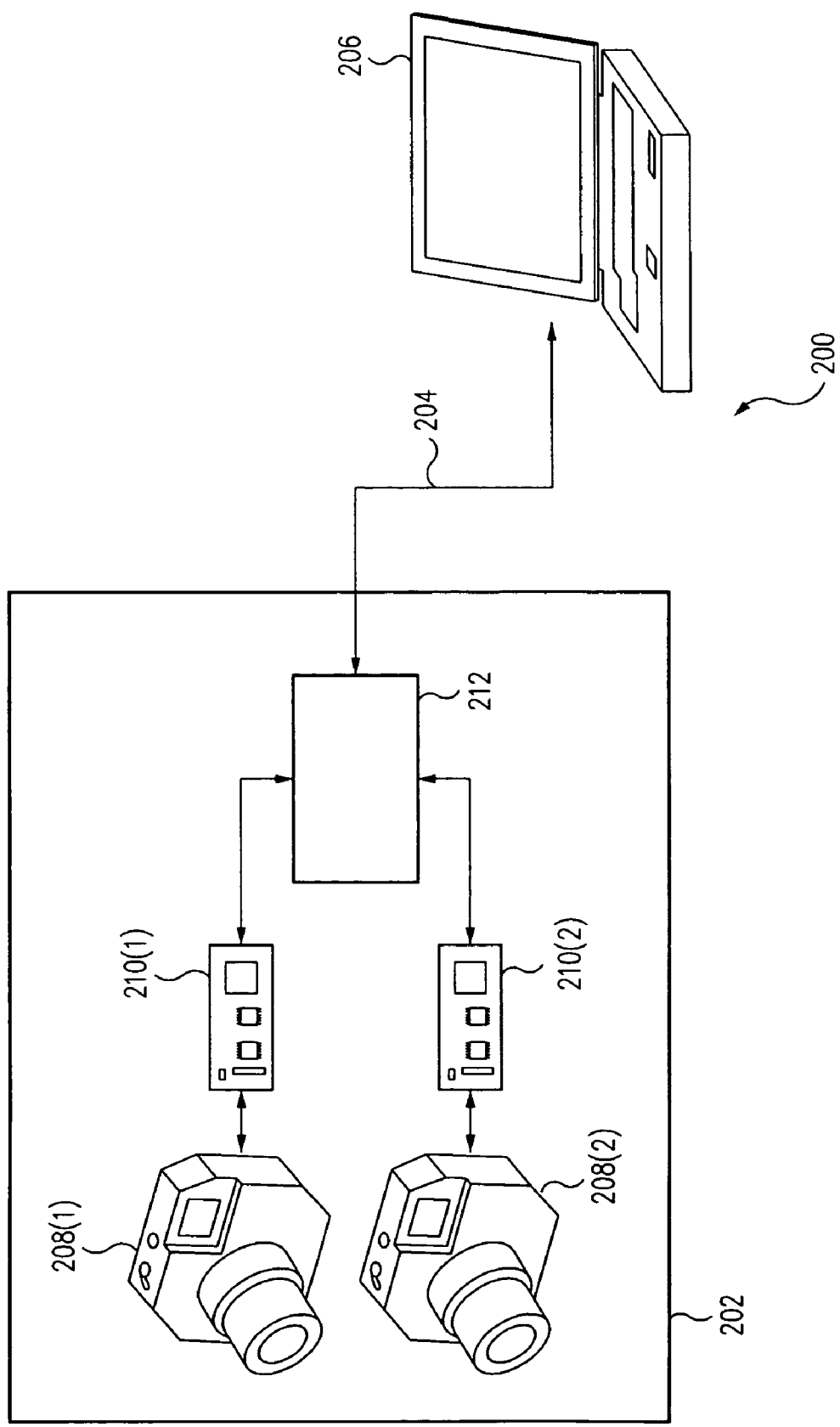
FIG. 2 shows a block diagram illustrating a camera system in accordance with an embodiment of the present invention.

FIG. 2 shows a block diagram illustrating a camera system 200 in accordance with an embodiment of the present invention. Camera system 200 includes camera system 202, an interface 204, and an external device 206. Camera system 202 may represent an exemplary implementation of camera system 100 (FIG. 1), with camera system 202 including cameras 208(1) and 208(2).

For example, cameras 208(1) and 208(2) may each be implemented as infrared cameras (e.g., each infrared camera having a 320 by 124 format focal plane array and a wide field of view lens). As an implementation example, cameras 208(1) and 208(2) may represent Photon infrared cameras equipped with a wide field of view lens (e.g., an f/1.2 firefighting lens), which is available from FLIR Systems™, Inc. Camera system 202 also includes corresponding circuits 210(1) and 210(2) for cameras 208(1) and 208(2).

As a specific example, circuits 210(1) and 210(2) may represent Gigabit Ethernet driver cards (e.g., Ethernet 10/100/1000 Base T) that feed a circuit 212 (e.g., a Gigabit Ethernet switch). Circuit 212 may further include an image processor and/or wireless Ethernet circuitry, with interface 204 representing a wired or a wireless interface. External device 206 may also provide camera control and other information to camera system 202 via interface 204. Consequently, the information (e.g., data and control information) may be transferred between camera 202 and external device 206 via interface 204.

Alternatively, only one circuit 210 may be provided to support cameras 208(1) and 208(2), with circuit 210 time-division multiplexing the data from cameras 208(1) and 208(2) and providing the data to external device 206. Consequently, circuit 212 (e.g., a switch) would not be required for this exemplary embodiment.

As an implementation example, with camera 208(1) and 208(2) each operating at a 30 frame per second rate and having 320 horizontal pixels and 124 vertical pixels and 14 bits per pixel, the photon bit rate provided by each will be 16,665,600 resulting in approximately a 33,331,200 bit rate provided by camera system 202. If interface 204 provides a 1,000,000,000 bit rate (e.g., a Gigabit Ethernet interface) with a 75% efficiency on the dedicated network for an actual bit rate of 750,000,000, sufficient bandwidth is available on interface 204 to support up to 22 of camera systems 202. If interface 204 provides a 100,000,000 bit rate with a 75% efficiency (e.g., 100 Mbps Ethernet), sufficient bandwidth is available on interface 204 to support two of camera systems 202.

For this implementation example, the data is provided in an uncompressed format. Alternatively, the data may be compressed (e.g., various types of lossy or lossless compression) to, for example, utilize the bandwidth in a more efficient fashion.

The information from cameras 208 may be displayed and/or recorded on external device 206 (e.g., a display, a computer, or other type of device capable of storing and/or displaying information). As an example and as discussed further herein, the information from cameras 208(1) and 208(2) may be displayed separately on external device 206 (e.g., information from cameras 208(1) and 208(2) displayed on the top half and the bottom half, respectively, of the display on external device 206. Alternatively, the information from cameras 208(1) and 208(2) may be merged and displayed as a merged image (e.g., a seamless panoramic view on the display of external device 206 to display the complete field of view covered by cameras 208).

Figure 3:
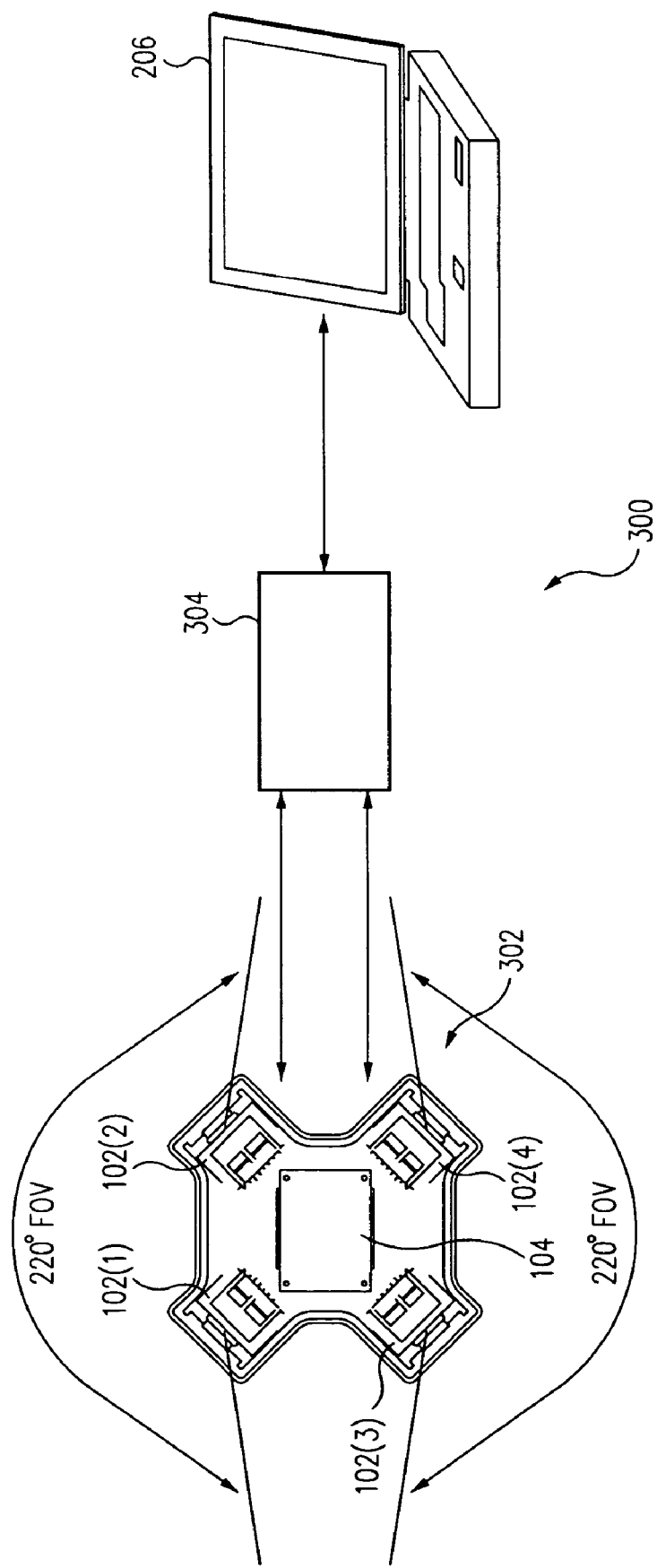
FIG. 3 shows a block diagram illustrating a camera system in accordance with an embodiment of the present invention.

As noted above, camera system 100 may include one or more cameras 102 and camera system 202 may include one or more cameras 208. For example, FIG. 3 shows a block diagram illustrating a camera system 300 in accordance with an embodiment of the present invention. Camera system 300 includes a camera system 302, an interface 304, and external device 206. Camera system 302 may represent camera system 100 having four of cameras 102 (i.e., cameras 102(1) through 102(4)) to provide a 360° FOV around camera system 302.

Camera system 302 also includes circuitry 104 to transfer information between cameras 102 to external device 206 via an interface 304. As a specific example, circuitry 104 may include Ethernet circuitry to receive the information from cameras 102 and provide the information to external device 206 via interface 304, which may represent an Ethernet switch. Interface 304 may be separate from camera system 302 or included within camera system 302 (e.g., combined with circuitry 104). The information may be transferred via a wireless or a wired connection between external device 206, interface 304, and/or camera system 302.

Figure 4:
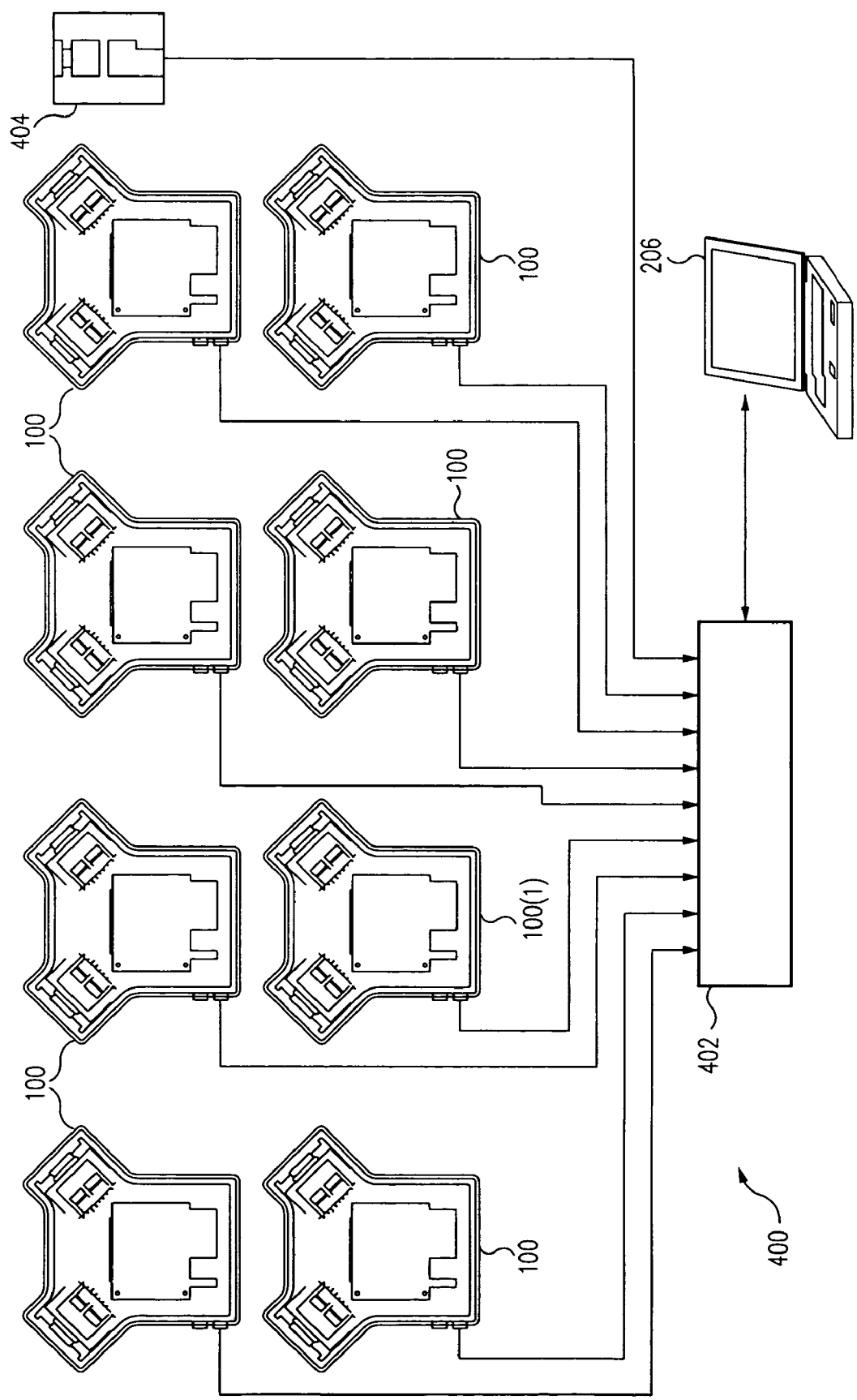
FIG. 4 shows a block diagram illustrating a camera system in accordance with an embodiment of the present invention.

A number of camera systems 100 may be combined within a camera system. For example, FIG. 4 shows a block diagram illustrating a camera system 400 in accordance with an embodiment of the present invention. Camera system 400 includes a number of camera systems 100 to form a network of linked camera systems 100. As an example, camera systems 100 may provide their information through one or more interfaces 402 (e.g., one or more Ethernet or network switches) to one or more external devices 206. As an example, the images provided by camera systems 100 may be provided in corresponding areas of a display on external device 206, one or more of the images may be merged together to form corresponding panoramic views on the display, and/or the images may be viewed sequentially or randomly from camera systems 100 on the display.

One or more of camera systems 100, such as shown in FIGS. 1 or 4, may implement one or more of cameras 102 with a narrow FOV (long-range optics) rather than a wide FOV. For example, as illustrated in FIG. 4, camera system 100(1), which may include one or two (as shown) of cameras 102, may implement camera 102 with long-range optics having a narrow FOV. Camera system 100(1) may then, for example, be mechanically-driven and controlled to direct one of cameras 102 at a point of interest within the FOV of one or more of the other camera systems 100 within camera system 400.

As a specific example, motion detected within the FOV of one of camera systems 100 (FIG. 4) may automatically result in one of cameras 102 within camera system 100(1) to be directed toward the detected motion to provide a higher resolution image of the area (also referred to herein as slew to queue as discussed further herein). Alternatively, if camera system 100(1) includes two or more of cameras 102, one of cameras 102 (i.e., referred to as camera 102(1)) may have long-range optics and be mounted within camera system 100(1) to point in the same general direction as another of cameras 102 (i.e., referred to as camera 102(2)) having a wide FOV. Camera 102(1) may then be mechanically driven to view any point of interest within the FOV of camera 102(2).

Alternatively in accordance with an embodiment of the present invention, camera system 400 may include one or more of cameras 404 having long range optics (i.e., a narrow field of view). Camera 404 may be directed (e.g., mechanically pointed) to any area of interest within the field of view of one or more of camera systems 100 in FIG. 4 to provide a higher resolution image of the desired area. For this example, camera systems 100 may be situated to provide fixed wide field of views of various areas, while one or more of cameras 404 may be situated to provide higher resolution images of a desired area within the wide field of views of camera systems 100 (e.g., slew to queue technique). As an implementation example, camera 404 may represent a Thermal Vision Sentry infrared camera system from FLIR Systems™, Inc. having a narrow field of view relative to cameras 102.

Figure 5:
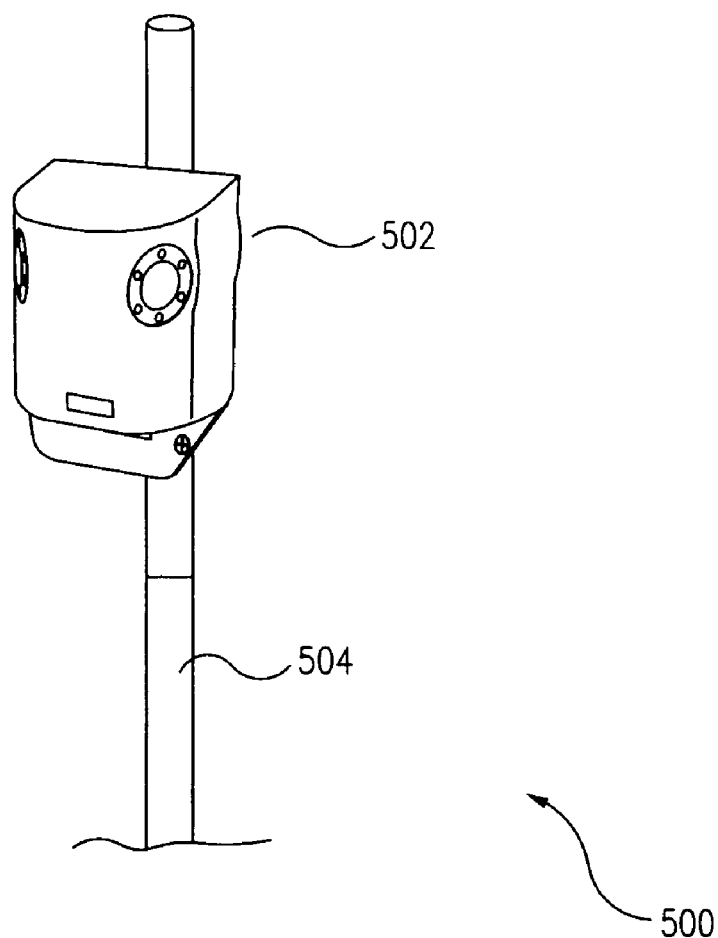
FIG. 5 shows a diagram illustrating a camera system in accordance with an embodiment of the present invention.

Camera system 100 (or camera 404) may be mounted, for example, to any type of structure, such as for example to a building, a wall, a surface (e.g., ground or table), a tripod, or a post or suspended in a desired location. As an example, FIG. 5 shows a diagram illustrating a camera system 500 in accordance with an embodiment of the present invention. Camera system 500 includes a camera system 502, which may represent or be similar to camera system 100 (FIG. 1) as described above. Camera system 502 is shown mounted to a post 504, which may for example be situated on a stand or sunk into the ground for stability.

Thus, camera system 500 may be easily deployed to a given area to be monitored (i.e., operated as stake-out monitors). As an example, camera system 500 may record snapshot or video images taken continuously or periodically and/or the information may be communicated wirelessly (or in a wired fashion) to a device for recording and/or viewing (e.g., by a user of the device).

Figure 6:
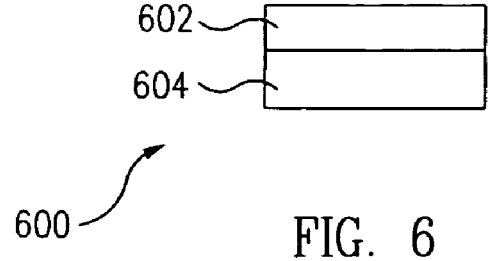
FIG. 6 shows an exemplary display screen in accordance with an embodiment of the present invention.

The images provided by one or more embodiments of the present invention (e.g., camera system 100 or 202) may be recorded and/or displayed in various formats. For example, FIG. 6 shows an exemplary display screen 600 in accordance with an embodiment of the present invention. Display screen 600 illustrates the display area for a first and a second image on a portion 602 and a portion 604, respectively, of display screen 600. The first and second image may also be displayed on any other portions of display screen 600, such as a left hand side and a right hand side, respectively, of display screen 600.

Figure 7:
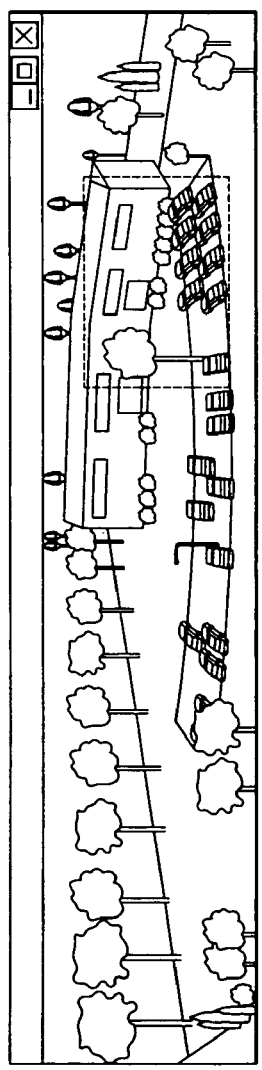
FIG. 7 shows an exemplary display screen in accordance with an embodiment of the present invention.

Alternatively, the images provided by one or more cameras (e.g., cameras 102(1) and 102(2) of FIG. 1) may have their images combined (e.g., stitched) to form a single image, such as a panoramic image on display screen 600. For example, FIG. 7 shows an exemplary panoramic image on display screen 600 in accordance with an embodiment of the present invention. The panoramic image on display screen 600 was formed via image processing technologies to combine an image from camera 102(1) with an image from camera 102(2) of camera system 100 to provide a seamless FOV greater than 160°. The same technique may be applied to images from a number of cameras 102 to provide, for example, an image having a FOV up to 360° (e.g., reconstructing multiple images provided via the Ethernet interface). Furthermore, a single image formed from multiple images may provide certain advantages, such as common features or controls (e.g., automatic gain control (AGC), image processing, contrast, and/or synchronization), over that of displaying multiple images.

Figure 9:
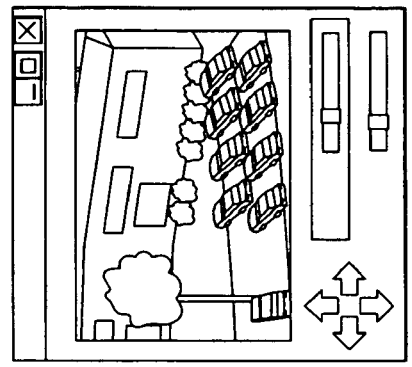
FIG. 9 shows an exemplary display screen in accordance with an embodiment of the present invention.
Figure 8:
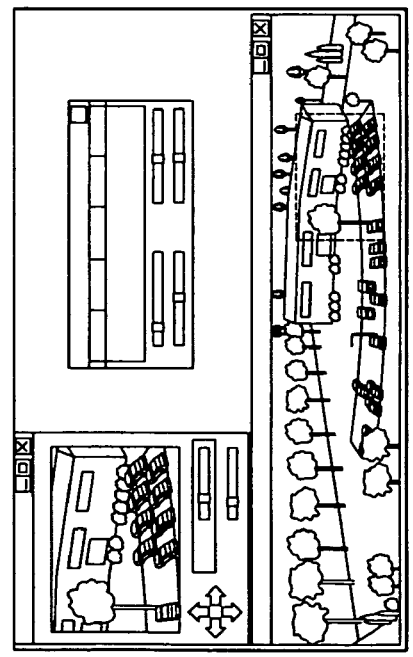
FIG. 8 shows an exemplary display screen in accordance with an embodiment of the present invention.

The panoramic image may be displayed over the entire screen area of display screen 600 or over a designated portion of display screen 600. For example, FIG. 8 shows exemplary images on display screen 600 in accordance with an embodiment of the present invention. Display screen 600 of FIG. 8 shows the panoramic image of FIG. 7 displayed over only a portion of display screen 600, which for this example is over portion 604. FIG. 8 also shows that a portion of the panoramic image may be designated and displayed as a higher resolution image on a portion of display screen 600 (e.g., a left-hand portion of portion 602). The higher resolution image may also be selected to be displayed over the entire screen area of display screen 600, for example as illustrated in FIG. 9 in accordance with an embodiment of the present invention.

The higher resolution image, for example, may be provided via image processing techniques to zoom in on a portion of the panoramic image. Alternatively, as discussed previously, a higher resolution camera (e.g., camera system 100(1) of FIG. 4 as discussed above) may be directed to the point of interest to provide the higher resolution image.

As an implementation example, display screen 600 (e.g., a variable graphics array (VGA) monitor may be incorporated as part of external device 206 (e.g., a computer as shown in FIG. 2) to provide real time image displays (e.g., scalable panoramic and zoom windows). As an example, external device 206 may receive the images from a camera system (e.g., camera system 100) via a Gigabit Ethernet interface (e.g., TCP/IP based), which for example may support up to ten camera systems 100.

Figure 10:
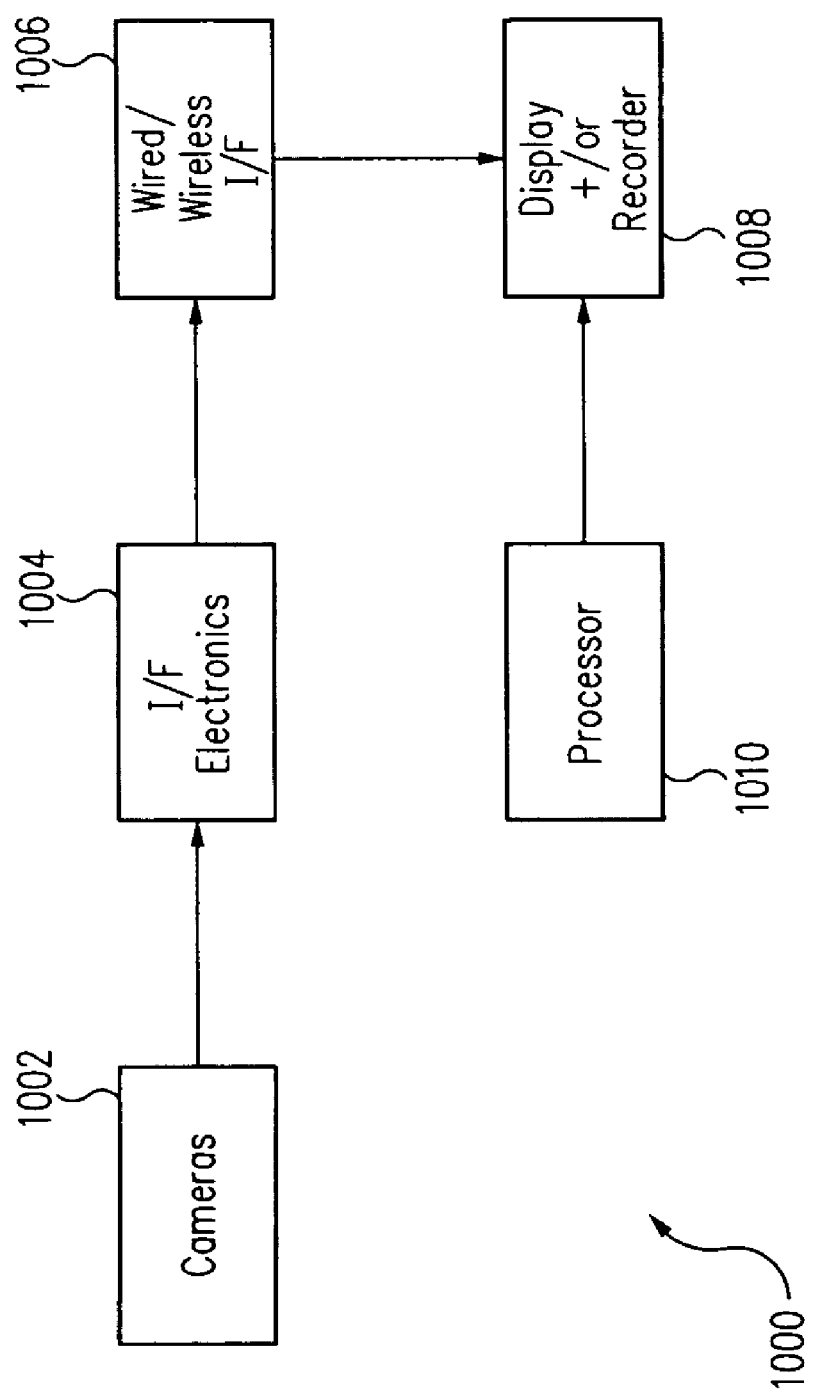
FIG. 10 shows a functional block diagram of a camera system in accordance with an embodiment of the present invention.

FIG. 10 shows a functional block diagram of a camera system 1000 in accordance with an embodiment of the present invention. Camera system 1000 includes cameras 1002, interface electronics 1004, an interface 1006, a device 1008, and a processor 1010. It should be understood that one or more components of camera system 1000 may be combined and that camera system 1000 represents functionally certain functions of a camera system in accordance with an embodiment of the present invention.

Cameras 1002 may, for example, represent one or more of cameras 102, cameras 208, and/or cameras 404. Interface electronics 1004 represents the circuitry required to transfer data to and/or from cameras 1002 to device 1008 via interface 1006 (e.g., a wired or a wireless interface).

Device 1008 may represent a recorder, a display, or other type of device (e.g., a computer) that can display and/or store the data from cameras 1002. Processor 1010 is optional and may be utilized to assist device 1008 with the displaying and/or recording of the data from cameras 1002. For example, processor 1010 may be a video processor or an image processor (e.g., a digital image processor) that can provide data or image manipulation for device 1008.

As an example, device 1008 along with processor 1010 may provide stitching or merging of the data from cameras 1002 to provide split screen or panoramic images from two or more of cameras 1002, motion detection, slew to queue (e.g., to direct one or more narrow FOV cameras), and digital zoom. Furthermore, processor 1010 may allow user controlled or automatic gain control for single images or multiple combined images along with contrast, synchronization, and other image processing options.

In accordance with one or more embodiments of the present invention, a camera system is disclosed that provides a real-time wide FOV (e.g., greater than 160°), with the ability to detect a distant object (e.g., a person or an automobile at approximately 150 meters). The camera system, for example, may provide information via a wired or a wireless interface to provide real-time uncompressed digital data over the interface (e.g., uncompressed video-over-Internet protocol video images) and receive control information (e.g., camera control signals). The camera system may include a number of cameras within the camera system (e.g., to provide 360° area awareness) and/or be incorporated into a plug-and-play network having a number of camera systems (e.g., to provide perimeter and facility security monitoring). As an example, a ThermoVision® WideEye™ camera (available from FLIR Systems™ Inc.) may represent an exemplary implementation of a camera system embodying one or more of the techniques discussed herein in accordance with an embodiment of the present invention.

The camera system may provide certain advantages over conventional camera systems, such as a mechanically-driven camera (e.g., having pan, tilt, and zoom (PTZ) functionality). Furthermore, the camera system may be deployed as a mobile or man-portable application (e.g., a deployable, modular, networkable, ultra-wide FOV thermal imager). Because of the camera system's wide field of view, there is less chance of a missed event, which may occur with mechanically-driven cameras because of the camera pointing or being slewed away from an area of interest.

The camera system may be implemented to accept multiple power forms and be networkable via a wired (e.g., an Ethernet network, such as a Gigabit Ethernet network) or a wireless interface (e.g., IEEE 802.11 standard, such as for example the 802.11g standard), with the information encrypted if desired. Also, multiple camera systems may be combined on a single network to provide real-time coverage of ultra-wide areas. Additionally, one or more of the camera systems-may include one or more cameras with longer-range optics to provide longer-range, narrower FOVs on specific areas of interest. As an example, a ThermoVision® Micron™ camera (available from FLIR Systems™, Inc.) may be included as one of the cameras in one or more of the camera systems to provide a magnified view of a certain area of interest.

Furthermore, the camera system may be implemented to provide ultra high resolution in a desired format, such as to provide a wide horizontal FOV. A user interface on a device linked to the camera system may allow a full panoramic view displayed with electronic panning and point and click zoom to allow a nearly instantaneous movement between widely spaced points of interest.

Embodiments described above illustrate but do not limit the invention. It should also be understood that numerous modifications and variations are possible in accordance with the principles of the present invention. Accordingly, the scope of the invention is defined only by the following claims.

We claim:

1. A camera system comprising:
   a first infrared camera having a first field of view and adapted to provide thermal image data, wherein the first infrared camera comprises a first detector having a different number of pixels in a horizontal direction relative to a vertical direction to provide the thermal image data for the desired first field of view;
   a second infrared camera having a second field of view and adapted to provide thermal image data, wherein the second infrared camera comprises a second detector having a different number of pixels in a horizontal direction relative to a vertical direction to provide the thermal image data for the desired second field of view, wherein the first and second field of views provide a wide field of view based on substantially all of the thermal image data from the pixels of the first and second detectors;
   an interface circuit adapted to receive and transfer the thermal image data from the first and second infrared cameras to a network; and
   a first camera housing at least partially enclosing the first and second infrared cameras and the interface circuit to form a first camera system adapted to couple to the network, wherein a processor coupled to the network may receive the thermal image data from one or more of the first camera systems coupled to the network to display the thermal image data from at least one of the first camera systems.

2. The camera system of claim 1, wherein the thermal image data from the first and second infrared camera comprises uncompressed digital thermal image data.

3. The camera system of claim 1, wherein the first and second field of view are adapted to provide a combined field of view greater than 160°.

4. The camera system of claim 3, wherein the first and second infrared cameras comprise focal plane arrays having a horizontal field of view at least twice that of its vertical field of view.

5. The camera system of claim 4, wherein the focal plane array format comprises a 320 by 124 format.

6. The camera system of claim 1, wherein the interface circuit transfers the thermal image data to an external device comprising the processor and a display coupled to the processor.

7. The camera system of claim 6, wherein the interface circuit further comprises an Ethernet driver circuit adapted to receive and transfer the thermal image data from the first and second infrared camera to the external device via an Ethernet switch.

8. The camera system of claim 6, wherein the interface circuit transfers the thermal image data from the first and second infrared camera to an external device via a wireless interface.

9. The camera system of claim 1, further comprising an external device, comprising the processor and a display coupled to the processor, adapted to receive the thermal image data from the interface circuit and record and/or display the thermal image data.

10. The camera system of claim 9, wherein the external device is further adapted to display the thermal image data sequentially from each of the first camera systems or as a merged image to form a panoramic view based on the thermal image data from one or more of the first camera systems.

11. The camera system of claim 1, wherein the number of pixels in the horizontal and vertical directions for the first and second detectors are selected to provide the corresponding desired first and second field of views.

12. The camera system of claim 1, further comprising a third infrared camera having a third field of view and adapted to provide thermal image data, wherein the third field of view is less than the first and second field of view.

13. The camera system of claim 12, wherein the third infrared camera is adapted to be mechanically-driven to point at an area of interest within the first and/or second field of view.

14. A method of viewing an area of interest, the method comprising:
 providing a first thermal image data covering a first wide field of view from a first camera system, wherein the first wide field of view is based on dimensions of a first detector having a different number of pixels in a horizontal direction relative to a vertical direction to provide the first thermal image data;
 providing a second thermal image data covering a second wide field of view from the first camera system, wherein the second wide field of view is based on dimensions of a second detector having a different number of pixels in a horizontal direction relative to a vertical direction to provide the second thermal image data, and wherein the second wide field of view overlaps a portion of the first wide field of view;
 transferring the first and second thermal image data from the first camera system along with the first and second thermal image data from at least one other of the first camera systems through a network; and
 displaying the first thermal image data and the second thermal image data selectively from one or more of the first camera systems in a separate or panoramic fashion.

15. The method of claim 14, wherein the displaying is adapted to provide a panoramic view of the first and second thermal image data from two or more of the first camera systems within a first portion of a display.

16. The method of claim 14, wherein the first and second wide field of view each comprises a horizontal field of view that is at least twice as large as its vertical field of view.

17. The method of claim 14, wherein the providing for the first thermal image data and the providing for the second thermal image data comprises real-time uncompressed digital thermal image data.

18. The method of claim 14, further comprising providing a third thermal image data covering a third narrow field of view, wherein the third narrow field of view may be directed to a portion of the first or second wide field of view.

* * * * *